(12) United States Patent
Trenkenschu

(10) Patent No.: US 8,014,001 B2
(45) Date of Patent: Sep. 6, 2011

(54) SCANNER SYSTEM AND METHOD OF MEASURING A SURFACE TOPOGRAPHY

(75) Inventor: Adolf Trenkenschu, Long Grove, IL (US)

(73) Assignee: Prairie Seating Corporation, Skokie, IL (US)

( * ) Notice: Subject to any disclaimer, the term of this patent is extended or adjusted under 35 U.S.C. 154(b) by 574 days.

(21) Appl. No.: 12/237,847

(22) Filed: Sep. 25, 2008

(65) Prior Publication Data

US 2010/0073685 A1    Mar. 25, 2010

(51) Int. Cl.
*G01B 11/24* (2006.01)
(52) U.S. Cl. ...................................................... 356/608
(58) Field of Classification Search .................. 356/601, 356/608; 250/559.22; 382/154
See application file for complete search history.

(56) References Cited

U.S. PATENT DOCUMENTS

| | | |
|---|---|---|
| 4,525,130 A | 6/1985 | Netznik |
| 4,637,789 A | 1/1987 | Netznik |
| 2004/0098133 A1 | 5/2004 | Carignan et al. |
| 2004/0168329 A1 | 9/2004 | Ishimaru |
| 2004/0260402 A1 | 12/2004 | Baldini et al. |
| 2006/0247892 A1 | 11/2006 | Peterson |
| 2006/0283243 A1 | 12/2006 | Peterson |
| 2009/0153878 A1* | 6/2009 | Fujii .............................. 356/601 |

* cited by examiner

*Primary Examiner* — Roy M Punnoose
(74) *Attorney, Agent, or Firm* — Greer, Burns & Crain, Ltd.

(57) ABSTRACT

A system and method for measuring and developing a topography of a surface of a person or an object. The system includes a container having a flexible outer surface against which the person is to be placed. A deformable material located in the container can be rendered rigid while the person is positioned thereagainst to hold a shape of the outer surface of the container after the person is removed from against the container. A contact free measuring device is operatively connected to a memory device and arranged to measure distances from the measuring device to a plurality of points on the surface of the container and to store those distances in the memory device in digital form. A mounting mechanism may orient or couple the container to the measuring device, permitting the measuring device to be positioned and at least temporarily held fixed relative to the container within a predetermined distance range.

23 Claims, 3 Drawing Sheets

SCANNER SYSTEM AND METHOD OF MEASURING A SURFACE TOPOGRAPHY

BACKGROUND OF THE INVENTION

The present invention relates to methods and devices for scanning a surface to measure and develop a topography of the surface and to fabricate a custom shaped cushion based on the measured surface topography.

Developing and measuring a topography of a surface is useful in many situations where the surface is to be duplicated in another structure. For example, in the production of custom fitted cushions, such as those used in wheelchair seats and backs designed for a particular patient, it is necessary to measure and develop the precise topography or surface shape of the patient's back and seat in order to produce a complementary shaped cushion.

An apparatus is disclosed in U.S. Pat. No. 4,525,130 which is an adjustable molding frame with moldable cushions that can be used to make an impression of the patient's back and seat for development of a reverse plaster or rigid foam cast, which plaster or rigid foam cast can then be used to make a foam cushion. For example, U.S. Pat. No. 4,637,789 discloses an apparatus for making the foam cushion by using the plaster or rigid foam cast.

SUMMARY OF THE INVENTION

A system and method for measuring and developing a topography of a surface of a person or an object is provided. In an embodiment, the system includes a container having a flexible outer surface against which the person is to be placed. A deformable material is located in the container which can be rendered rigid while the person is positioned thereagainst and while the container surface is manipulated to conform to the person's shape. In this way, the shape of the outer surface of the container will be held after the person is removed from against the container. A contact free measuring device is operatively connected to a memory device and arranged to measure distances from the measuring device to a plurality of points on the surface of the container and to store those distances in the memory device in digital form. A mounting mechanism orients or couples the container to the measuring device, permitting the measuring device to be positioned and at least temporarily held fixed relative to the container within a predetermined distance range.

An embodiment of a method for developing a digital topography of a surface of a person or an object includes the step of placing the person against a container having a flexible outer surface. The method also includes rendering a deformable material located in the container rigid while the person is positioned thereagainst and while the outer surface of the container is manipulated to conform to the outer shape of the person. When the deformable material is made rigid, it will hold the shape of the outer surface of the container after the person is removed from against the container. The container is coupled to a contact free measuring device via a mounting mechanism in such a way as to permit the measuring device to be oriented and at least temporarily held fixed relative to the container within a predetermined distance range. The contact free measuring device is operatively connected to a memory device. The contact free measuring device is used to measure distances from the measuring device to a plurality of points on the surface of the container. The measured distances are then stored in the memory device in digital form.

DETAILED DESCRIPTION OF THE EMBODIMENTS

A system and method for measuring and developing a topography of a surface of a person or an object is provided. While the object may be virtually any three dimensional object, embodiments of the invention find particular utility in measuring the topography of a surface on which an impression of a seated person's back, seat and upper leg area has been made. The embodiments of the invention will be described herein in the context of measuring such a surface, even though the invention is not limited to such embodiments, but only by the scope of the claims appended hereto.

Figure 1:
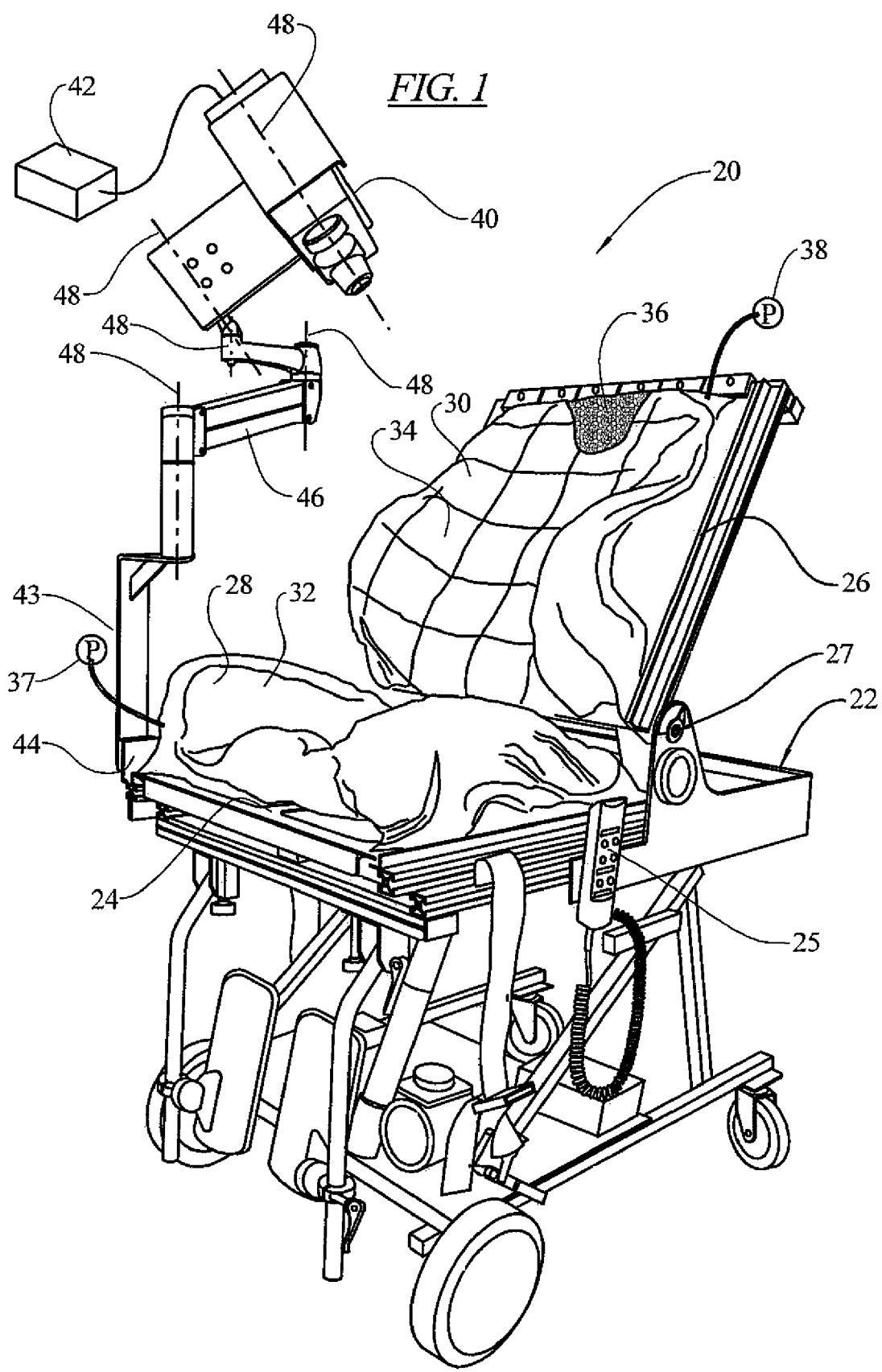
FIG. 1 is a perspective view of an embodiment of a scanning system.

In an embodiment as shown in FIG. 1, a system 20 includes a support structure 22 which includes a seat pan 24 positioned on the support structure in a generally horizontal plane and a back panel 26 coupled to the seat pan in a generally vertical plane. The seat pan 24 and the back panel 26 could be arranged in different orientations, depending on the person whose surface shape is being captured and measured, however, for the particular embodiment described herein, the generally horizontal and vertical planes are appropriate. The seat pan 24 and the back panel 26 may be movable relative to one another, in a manner such as described in U.S. Pat. No. 4,525,130, whose disclosure is incorporated herein by reference in its entirety for all purposes.

The support structure 22 may include a first adjusting mechanism such as a motor driven screw operated by a controller 25 coupling the seat pan 24 and the back panel 26 to adjust a length of the seat pan extending forwardly from the back panel. The support structure 22 may also include a second adjusting mechanism such as a motor driven screw or a hydraulic or pneumatic cylinder also operated by the controller 25 coupling the seat pan 24 and the back panel 26 (which is pivotally mounted at 27) to adjust an angle therebetween in accordance with the orientation of the person seated thereagainst. Such adjustable mechanisms may be useful in capturing the shape of a variety of objects, in addition to human shapes.

The system includes a first container 28 comprising a pliable sealed container positioned on the seat pan 24 and a second container 30 comprising a pliable sealed container positioned on the back panel 26. The first container has a flexible outer surface 32 and the second container has a flexible outer surface 34. The person is to be placed against the outer surfaces 32, 34 to make a shape impression on the outer surfaces complementary to the shape of the person.

A deformable material 36 is located in each of the containers 28, 30 which can be rendered rigid while the person is positioned thereagainst to hold a shape of the outer surfaces 32, 34 of the containers after the person is removed from against the container. For example, the containers 28, 30 may have the form of latex rubber bags that are filled with loose polyethylene beads. The interior of the containers 28, 30 may be evacuated of air, such as with a first 37 and second 38 vacuum pump connected to the interior of the containers. Alternatively, a single vacuum pump may be utilized with conduits leading to each of the containers 28, 30, and appropriate controllable valves. When this is done, the containers 28, 30 will retain their shape. Thus, if the person is pressed against the containers 28, 30, such as with a person sitting on the first container and pressing back against the second container, while the containers have air in them, the beads will move around so that the outer surfaces 32, 34 of the containers will assume the shape of the person's back, seat and upper legs. In many instances it is necessary to physically manipulate the containers 28, 30 and their outer surfaces 32, 34, such as by pulling or pushing on parts of the containers while the person is sitting or pressing against the containers. The air may be slowly evacuated from the containers 28, 30 while this manipulation occurs, even with occasional stopping of the evacuation while the manipulation occurs, so that the outer shape of the containers closely captures the persons shape in all areas that are to be a part of the finished cushions. When the containers 28, 30 are evacuated of air, the containers will become rigid and retain their shape, even after the person moves away from the containers, and the outer surfaces 32, 34 of the containers will retain their shape which is complementary to the person's back, seat and upper legs.

Other deformable materials may be used in the containers 28, 30, such as a hardening foam which can be introduced into the containers or a material that may rigidify under other conditions, such as by being irradiated with microwaves or other electromagnetic energy to cause a binder to activate. Other arrangements known in the art could also be used to achieve the rigid outer surfaces 32, 34.

A contact free measuring device 40 is operatively connected to a memory device 42 and is arranged to measure distances from the measuring device to a plurality of points 44 on the outer surfaces 32, 34 of the containers 28, 30 and to store those measured distances in the memory device in digital form. The measuring device 40 may comprise a laser connected to a computing device and arranged to measure a distance from the laser to the container surfaces and to store that distance in the computing device. The measuring device 40 may also comprise a scanning mechanism arranged to carry the laser and to direct the laser over a scanning path covering a field of view having a width and a height located within a predetermined distance range from the laser. For example, the measuring device 40 may be a scanner, such as an ESCAN laser scanner available from 3D Digital Corp. of Sandy Hook, Conn. or a NextEngine 3D scanner available from NextEngine, Inc. of Santa Monica, Calif., which can be connected to a personal computer for running the imaging and measuring software and storing the measured results.

Other types of measuring devices may be utilized within the scope of the present invention. For example, digital cameras or other non-contacting measuring devices that utilize some form of electromagnetic energy such as infrared or visible light emitted from the measuring device, and reflected by the surface, to determine the distance from the measuring device to the plurality of points on the surface.

A mounting mechanism 43 couples the containers 28, 30 to the measuring device 40, permitting the measuring device to be oriented and at least temporarily held fixed relative to the containers within a predetermined distance range. The mounting mechanism 43 may comprise an adjustable clamp 44 with one or more swivel or movable arms 46 carrying the measuring device 40. For example, the mounting mechanism 43 may comprise a computer monitor mount with several axes of rotation. It has been found that with a mounting mechanism with six axes of rotation, the measuring device 40 can be arranged to capture the contour of nearly every surface configuration of either container, including concave contours on the sides of the containers. The mounting mechanism 43 can be secured to the support structure 22, or to either the seat pan 24 or back plate 26, which will render the mounting mechanism and the measuring device 40 fixed relative to the containers. The mounting mechanism 42 may also be mounted to other structures, or even carried on a separate stand positioned on the floor, a wall or the ceiling of the room where the containers 28, 30 are located, and in such case, the mounting mechanism and measuring device 40 will be fixed relative to the containers, so long as the containers are not moved relative to the mounting mechanism while the distances are being measured.

The measuring device 40 may be arranged to include in its scan a plurality of reference points when multiple positions of the measuring device are used to measure the topography of a surface from several vantage points as discussed below. During each individual measurement, the measuring device 40 should remain stationary relative to the surface being measured unless there is also a relative motion measuring input that is correlated to the measurement data.

With the measuring device 40 held fixed relative to the outer surfaces of the containers, the surface contour may be measured and stored. In some situations the field of view of the scanner or measuring device 40 may be smaller than the surfaces 32, 34 whose contour is being measured. In that case, after a first measurement is made, the measuring device 40 may be reoriented, either by moving the arms 46 of the mounting mechanism 42 or by moving the entire mounting device moved relative to the containers and a second measurement can then be taken. This continues until the entire surface area has been measured. The arms 46 of the mounting mechanism 42 may be movable about one or more axes 48, for example, three perpendicular axes, such that the measuring device may be moved to any desired location relative to the surfaces 32, 34 to allow make the appropriate measurements to be made.

Figure 2:
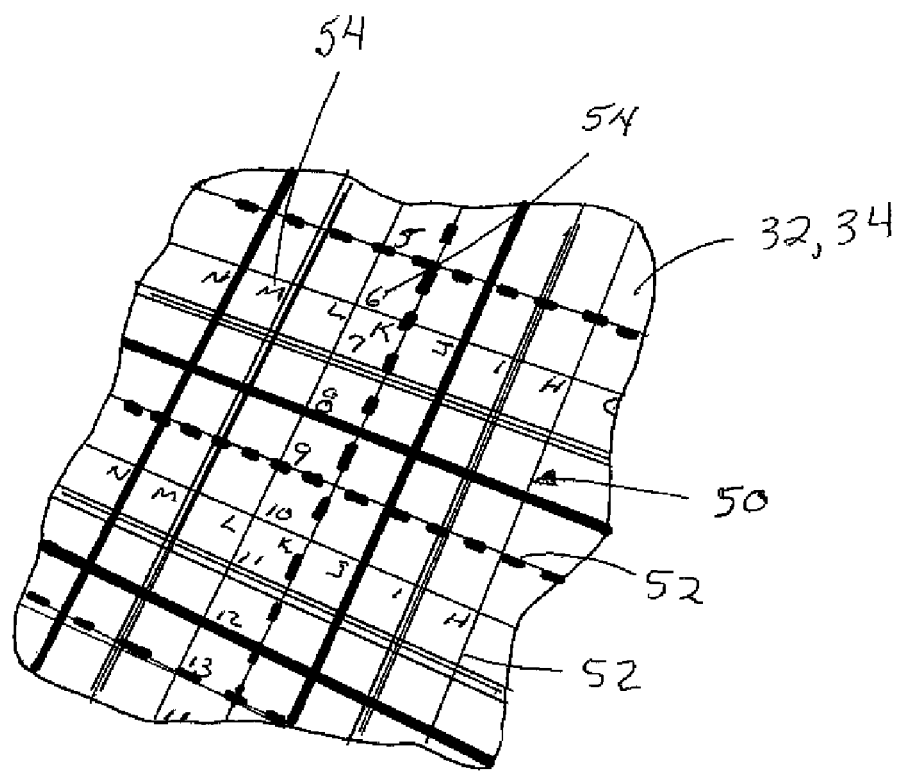
FIG. 2 is a partial perspective view of a portion of a container surface.

In order to integrate the entire surface from multiple measurements, it is necessary for there to be at least two common points detected from each two scans to allow the scan measurements to be integrated or electronically stitched together. To assist in the determination of two common points on adjacent scans, as illustrated in FIG. 2, the outer surfaces 32, 34 of the containers 28, 30 may be marked with a grid pattern 50. To further differentiate the points on the surface, and to assure that identical points are being matched up, the grid pattern 50 may comprise grid lines 52 of varying colors, thicknesses, or appearances, such as different patterns. Further, or alternatively, the grid pattern 50 may be provided with a plurality of unique indicia markings 54, such as ascending and/or descending numbers and/or letters. With this type of grid pattern 50 and markings 54, multiple measuring scans can readily be joined together in that identical points on adjacent scans can easily and positively be identified for joining purposes.

Figure 3:
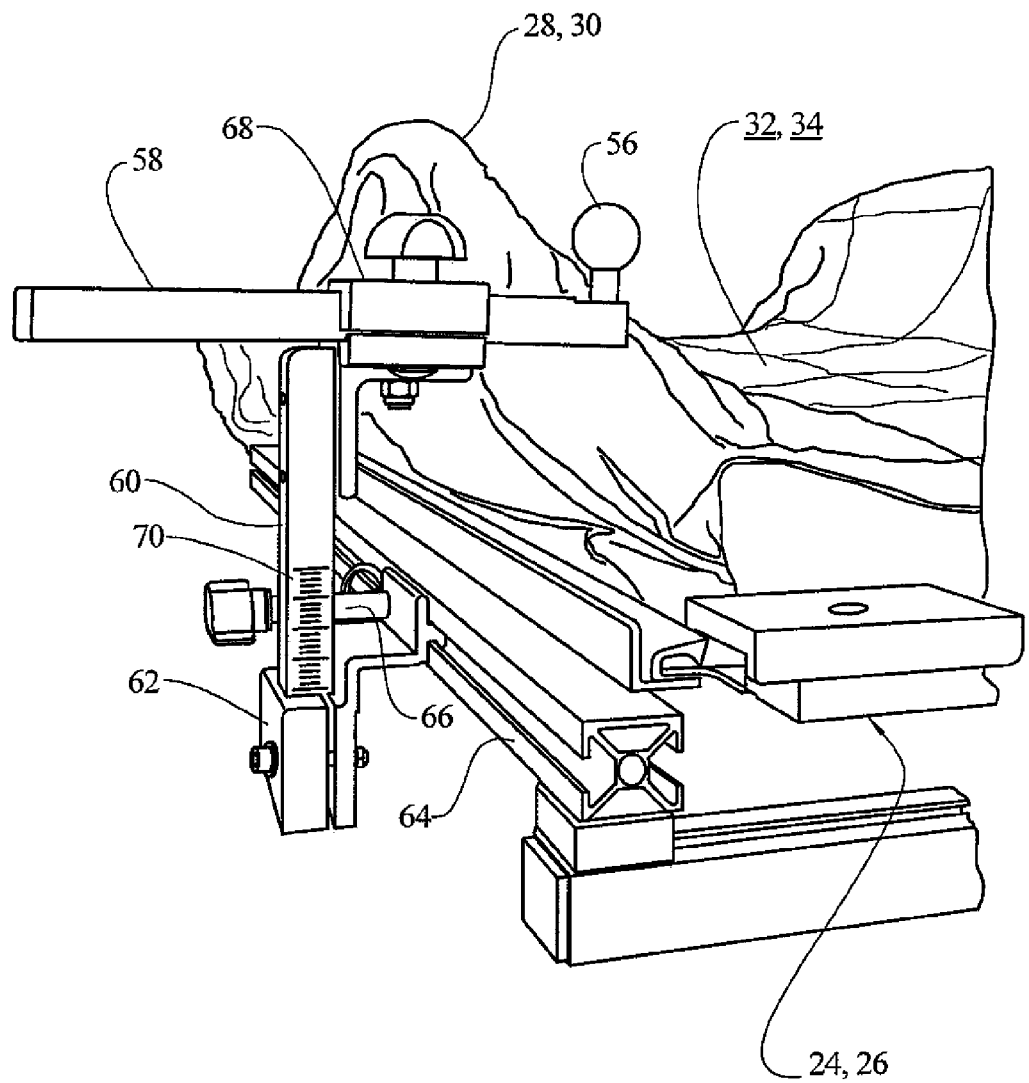
FIG. 3 is a partial perspective view of a portion of the seat pan or back panel.

In a use of the system 20 for manufacturing custom seating cushions, it is important to determine not only the topography of the surfaces 32, 34 of the containers 28, 30, but also their orientation relative to the supporting frame of the seat pan 24 and the back panel 26. To provide this orientation, a pair of reference points 56 in the form of user locatable surfaces, may be arranged relative to the seat pan 24 and back panel 26 as shown in FIG. 3. In this FIG., one of the reference points is shown to be a ball element carried on a first slidable arm 58 so that the reference point 56 may be moved laterally into the field of view of the measuring device 40. The first slidable arm 58 is carried on a second slidable arm 60 which is slidably mounted in a clamp 62 with the second slidable arm being arranged to slide perpendicularly relative to the sliding movement of the first slidable arm, so as to move the reference point 56 closer towards, or further away from, the seat pan 24 or the back panel 26. The clamp 62 itself is slidable relative to the seat pan 24 or back panel 26, such as by being mounted in a frame channel 64 that runs longitudinally along a side of the seat pan or back panel. The sliding position of the clamp 62 may be selected to place the reference point 56 in the field of view of the measuring device 40, such as by moving the clamp up against a pin 66 inserted into the channel at one of one or more fixed locations. The second slidable arm 60 is then adjusted relative to the seat pan 24 or back panel 26 and then the clamp 62 is tightened to lock the second slidable arm in a fixed position. The first slidable arm is then moved to place the reference point 56 in the field of view of the measuring device 40. The position of the first slidable arm is then locked by a second clamp 68. In this way, the position of the reference point 56 is fixed relative to the seat pan 24 or back panel 26 by the slidable arms 58, 60 which make up the first reference point mechanism.

A second reference point 56 is then installed on an opposite side of the seat pan 24 or back panel 26. To do this, a second pin 66 is placed into a fixed position at a position along the length of the seat pan 24 or back panel 26 identical to the placement of the first pin 66. This can be achieved by having a series of pre-drilled holes in the frame channel 64 for receiving the pins. The second sliding arm 60 of the second reference point mechanism is then slid to an identical position as the second slide arm of the first reference pint mechanism. This can be achieved by including a measuring scale or set of markings 70 on the second slidable arm 60 whose position can be noted relative to the clamp 62. This will place the second reference point 56 at an identical distance from the seat pan 24 or back panel 26 so that a "level" reference can be made by the measuring device. The first slidable arm 58 of the second reference point mechanism may be adjusted to place the second reference point 56 in the field of view of the measuring device 40, although its exact lateral position is not of significance since it is only its distance from the eat pan 24 or back panel 26 is being measured for reference.

In this manner, the orientation of the surfaces 32, 34 of the containers 28, 30 can be measured, irrespective of the contours of the edges of the containers, which may cause them to extend from the seat pan 24 or the back panel 26 to greater or lesser degrees for different persons or objects.

The digital measurement stored in the memory device 42 can be used in a CNC cutting machine to cut a mold pattern from a rigid material, such as a rigid polyurethane foam material. This mold pattern can then be used in lieu of the plaster cast used in the prior art constructions, to make a custom shaped seat cushion in the manner disclosed in U.S. Pat. No. 4,637,789 which is incorporated herein in its entirety for all purposes.

Since the measurement of the shape of the object, such as the person, may occur at quite some distance from where the seat cushions are being fabricated, the present invention allows for a near instantaneous transmission of the digital measurement information, rather than the shipping of a bulky plaster or rigid foam cast. This significantly reduces the time and cost involved in providing the shape information from the measurement location to the cushion fabrication location. Further, the mess associated with making a plaster or rigid foam cast can be avoided, as well as the time involved in preparing for making the plaster or rigid foam cast and waiting for the plaster or rigid foam to cure.

As has been described, one of the embodiments of the invention is a method for fabricating a custom shaped cushion to match a shape of a person's back and seat who is to sit on the cushion. This method includes a step of having the person sit on and recline against at least one of the containers 28, 30 having the flexible outer surfaces 32, 34. The outer surfaces 32, 34 of the containers 28, 30 is manipulated while the person is pressed against the containers so that the surfaces will conform to the person's shape. The deformable material 36 located in the container 28, 30 is rendered rigid while the person is positioned against the container to hold a shape of the outer surface 32, 34 of the container after the person has moved away from the container.

The container 28, 30 is coupled to the contact free measuring device 40 in such a way as to permit the measuring device to be oriented and at least temporarily held fixed relative to the container within a predetermined distance range. The contact free measuring device is connected to the memory device 42. The contact free measuring device 40 is operated to measure distances from the measuring device to a plurality of points on the surface 32, 34 of the container 28, 30 and the data relating to those measured distances is stored in the memory device 42 in digital form.

The data is used to fabricate a mold surface corresponding to at least a portion of the person's back and seat, such as by operation of a CNC cutting machine operating on a rigid material, such as a rigid polyurethane foam. A fluid foam material, such as a flexible polyurethane, is introduced into a mold cavity wherein the fabricated mold surface comprises a portion of the mold cavity. Thereafter, the foam material is allowed to cure.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An apparatus for use in developing a topography of a back surface of at least a portion of a person's back, seat and legs, comprising:
    a support structure;
    a seat pan positioned on the support structure in a generally horizontal plane;
    a back panel coupled to the seat pan in a generally vertical plane;
    first and second pliable, sealed containers positioned respectively on the seat pan and the back panel;
    a deformable material located in the first and second sealed containers;
    a first adjusting mechanism coupling the seat pan and the back panel to adjust a length of the seat pan extending from the back panel;
    a second adjusting mechanism coupling the seat pan and the back panel to adjust an angle therebetween in accordance with the orientation of the person seated thereagainst;
    a vacuum pump associated with each of the first and second containers to effect a gaseous evacuation of the first and second containers while the person is seated against the containers and to hold a shape of the containers after the person moves away from the containers;
    a laser connected to a computing device and arranged to measure a distance from the laser to the container surfaces and to store that distance in the computing device,
    a scanning mechanism arranged to carry the laser and to direct the laser over a scanning path covering a field of view having a width and a height located within a predetermined distance range from the laser,
    a mounting mechanism coupling one of the seat pan and the back panel to the scanning mechanism, permitting the scanning mechanism to be oriented and held fixed relative to one of the seat pan and the back panel within the predetermined distance range.

2. The apparatus of claim 1, wherein the surfaces of the containers are marked with a grid pattern.

3. The apparatus of claim 2, wherein the grid pattern is comprised of grid lines of varying colors.

4. The apparatus of claim 2, wherein the grid pattern is provided with a plurality of unique indicia markings.

5. The apparatus of claim 4, wherein the unique indicia markings comprise numbers.

6. The apparatus of claim 4, wherein the unique indicia markings comprise letters.

7. The apparatus of claim 1, wherein the mounting mechanism allows for reorientation of the scanner to a new fixed position.

8. The apparatus of claim 7, wherein the mounting mechanism allows for movement of the measuring device about three perpendicular axes.

9. The apparatus of claim 1, further including a plurality of user positionable reference points held in fixed position relative to at least one of the seat pan and the back panel within the field of view of the laser and scanning mechanism.

10. An apparatus for use in developing a digital topography of a surface of an object, comprising:
   a support structure;
   a pan positioned on the support structure in a first plane;
   a panel coupled to the pan in a second plane;
   first and second pliable, sealed containers positioned respectively on the pan and the panel;
   a deformable material located in the first and second sealed containers;
   a first adjusting mechanism coupling the pan and the panel to adjust a length of the pan extending from the panel;
   a second adjusting mechanism coupling the pan and the panel to adjust an angle therebetween in accordance with the shape or orientation of the object positioned thereagainst;
   a vacuum pump associated with each of the first and second containers to effect a gaseous evacuation of the first and second containers while the object is positioned against the containers and to hold a shape of the containers after the object is removed from against the containers;
   a contact free measuring device connected to a memory device and arranged to measure distances from the measuring device to a plurality of points on a surface of at least one of the containers and to store that distance in the memory device,
   a mounting mechanism coupling one of the pan and the panel to the measuring device, permitting the measuring device to be oriented and held at least temporarily fixed relative to one of the pan and the panel within a predetermined distance range.

11. The apparatus of claim 10, wherein the measuring device is a laser carried by a scanning mechanism.

12. The apparatus of claim 10, wherein the measuring device is a digital camera.

13. The apparatus of claim 10, wherein the measuring device uses electromagnetic energy emitted from the device, and reflected by the surface, to determine the distance from the measuring device to the plurality of points on the surface.

14. The apparatus of claim 13, wherein the electromagnetic energy emitted is in the visible light range.

15. An apparatus for use in developing a digital topography of a surface of an object, comprising:
   a container having a flexible outer surface against which the object is to be placed;
   a deformable material located in the container which can be rendered rigid while the object is positioned thereagainst to hold a shape of the outer surface of the container after the object is removed from against the container;
   a contact free measuring device operatively connected to a memory device and arranged to measure distances from the measuring device to a plurality of points on the surface of the container and to store those distances in the memory device in digital form,
   a mounting mechanism for the measuring device, permitting the measuring device to be oriented and at least temporarily held fixed relative to the container within a predetermined distance range.

16. The apparatus of claim 15, wherein the surfaces of the containers are marked with a grid pattern.

17. The apparatus of claim 16, wherein the grid pattern is provided with a plurality of unique indicia markings.

18. The apparatus of claim 15, wherein the mounting mechanism allows for reorientation of the measuring device to a new fixed position.

19. The apparatus of claim 15, wherein the measuring device is a laser carried by a scanning mechanism.

20. The apparatus of claim 15, wherein the measuring device is a digital camera.

21. The apparatus of claim 15, wherein the measuring device uses electromagnetic energy emitted from the device, and reflected by the surface, to determine the distance from the measuring device to the plurality of points on the surface.

22. A method for developing a digital topography of a surface of an object, comprising the steps:
   placing the object against a container having a flexible outer surface;
   rendering a deformable material located in the container rigid while the object is positioned thereagainst to hold a shape of the outer surface of the container after the object is removed from against the container;
   orienting the container relative to a contact free measuring device in such a way as to permit the measuring device to be at least temporarily held fixed relative to the container within a predetermined distance range;
   operatively connecting the contact free measuring device to a memory device;
   using the contact free measuring device to measure distances from the measuring device to a plurality of points on the surface of the container; and
   storing data relating to those measured distances in the memory device in digital form.

23. A method for fabricating a custom shaped cushion to match a shape of a person's back and seat who is to sit on the cushion, comprising the steps:
   having the person sit on and against at least one container having a flexible outer surface;
   rendering a deformable material located in the container rigid while the person is positioned thereagainst to hold a shape of the outer surface of the container after the person has moved away from the container;
   coupling the container to a contact free measuring device in such a way as to permit the measuring device to be oriented and at least temporarily held fixed relative to the container within a predetermined distance range;
   operatively connecting the contact free measuring device to a memory device;

using the contact free measuring device to measure distances from the measuring device to a plurality of points on the surface of the container;
storing data relating to those measured distances in the memory device in digital form;
using the data to fabricate a mold surface corresponding to at least a portion of the person's back and seat;
introducing a fluid foam material into a mold cavity wherein the mold surface comprises a portion of the mold cavity; and
allowing the foam material to cure.

* * * * *